United States Patent
Mattoon et al.

(10) Patent No.: US 6,910,804 B2
(45) Date of Patent: Jun. 28, 2005

(54) RESISTIVE TEMPERATURE DEVICE (RTD) MODULE WITH IMPROVED NOISE IMMUNITY

(75) Inventors: Carl V. Mattoon, Pullman, WA (US); Travis L. Mooney, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 32 days.

(21) Appl. No.: 10/658,858

(22) Filed: Sep. 9, 2003

(65) Prior Publication Data

US 2005/0052274 A1 Mar. 10, 2005

(51) Int. Cl.$^7$ ............................ G01K 7/16; G01K 7/21; G01K 15/00
(52) U.S. Cl. ............................ 374/172; 374/1; 374/185
(58) Field of Search ................................ 374/170, 163, 374/169, 171, 183, 185, 184, 1

(56) References Cited

U.S. PATENT DOCUMENTS

| | | | |
|---|---|---|---|
| 4,575,806 A | * | 3/1986 | Aldrich et al. ............... 702/133 |
| 4,642,636 A | * | 2/1987 | Smith et al. ........... 340/870.04 |
| 5,519,644 A | * | 5/1996 | Benton ......................... 702/88 |
| 5,655,841 A | * | 8/1997 | Storm ......................... 374/183 |
| 5,719,378 A | * | 2/1998 | Jackson et al. .............. 219/497 |
| 5,857,777 A | * | 1/1999 | Schuh ......................... 374/172 |
| 6,059,452 A | * | 5/2000 | Smith et al. ................. 374/169 |
| 6,501,257 B1 | * | 12/2002 | Elmore ......................... 324/74 |
| 6,612,737 B1 | * | 9/2003 | Lobban ....................... 374/183 |
| 6,824,307 B2 | * | 11/2004 | Vail et al. ................... 374/183 |

* cited by examiner

Primary Examiner—Gail Verbitsky
(74) Attorney, Agent, or Firm—Cook, Alex, McFarron, Manzo, Cummings & Mehler, Ltd.

(57) ABSTRACT

An RTD system includes multiple pluralities of RTDs and RTD bank assembly to which each plurality of RTDs are connected. Each RTD bank assembly includes a current source for the RTDs connected thereto, a multiplexer switching system for switching the current source successively between the RTDs, and a measurement function for measuring the voltage drop across the RTDs produced by the current source. The system includes a circuit for determining resistance of the RTD from the current applied thereto and the voltage drop there across. The system further includes a plurality of low pass filters associated, respectively, with each RTD, wherein the low pass filters are charged before the voltage measurement is made. The system includes a precharging arrangement where the low pass filter associated with the next RTD in a voltage sampling sequence is precharged, so that the delay between sampling of the voltage from the low pass filters associated with successive RTDs is significantly reduced. The system further includes low pass filters associated with calibration resistors which permit sampling of voltage values from the RTDs prior to the low pass filters associated therewith being fully charged, without error which would otherwise occur.

10 Claims, 5 Drawing Sheets

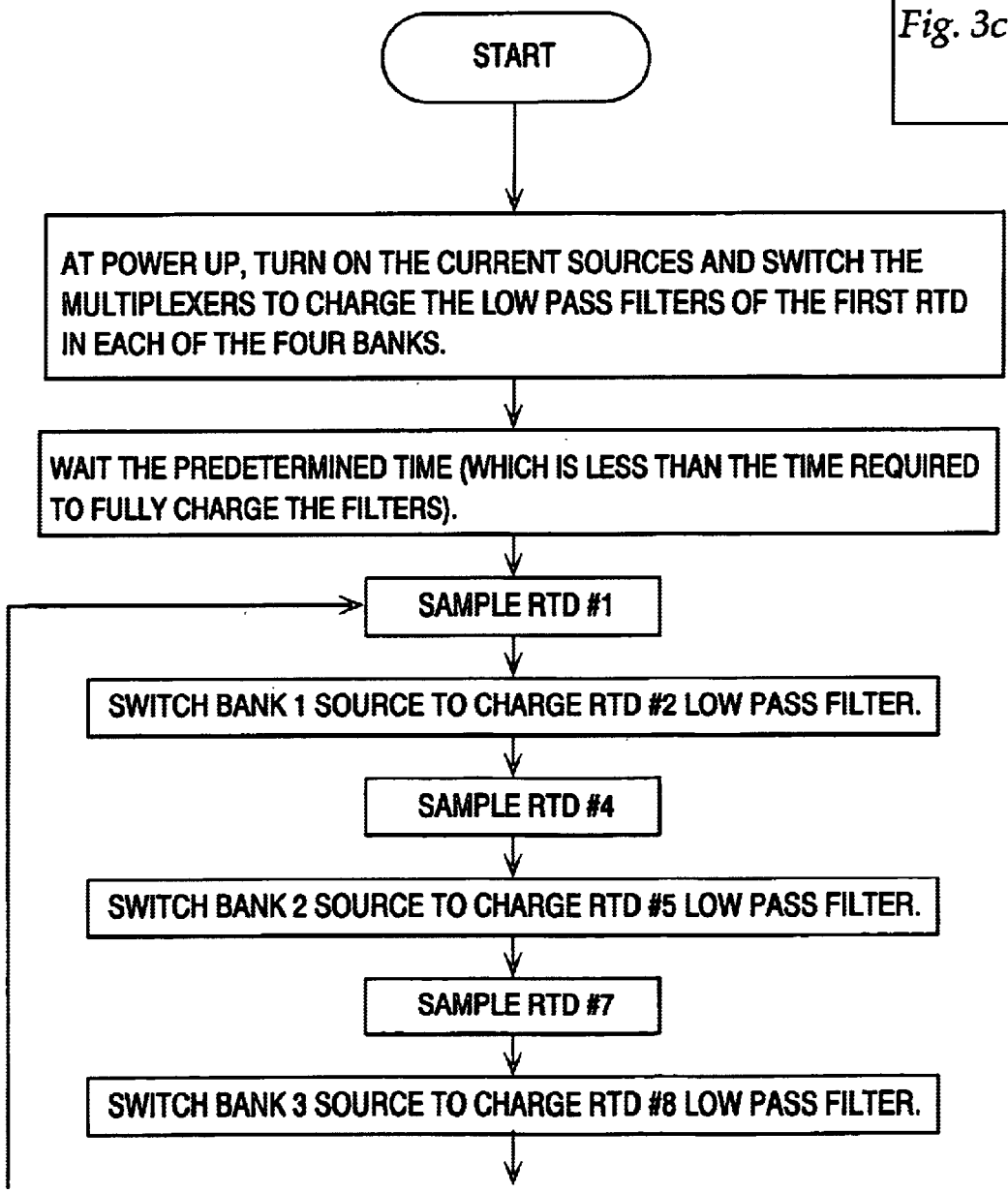

RESISTIVE TEMPERATURE DEVICE (RTD) MODULE WITH IMPROVED NOISE IMMUNITY

TECHNICAL FIELD

This invention relates generally to resistive temperature device (RTD) modules, and more specifically concerns a system for reducing/eliminating AC noise from the RTD voltage signal when the RTD is connected in an AC voltage environment, such as in a motor.

BACKGROUND OF THE INVENTION

A resistive temperature device (RTD) in operation responds to a change of temperature in its immediate vicinity (such as the windings of a motor) with a change in its resistance. The relationship between the change of resistance relative to a change in environmental temperature for each type of RTD is known. A current is applied to the RTD and the voltage drop across the RTD in response is determined. The resistance of the RTD is then calculated. The calculated resistance is then typically compared to a look-up table relating resistance to temperature to determine the environmental temperature. The RTD depends upon an accurate current source to provide accurate temperature determinations. RTD modules to which a plurality of RTDs is typically connected perform resistance determinations and transmit data from the RTDs. The RTDs typically are located in transformers, circuit breakers, motors, generators or other similar apparatus which require temperature monitoring.

RTDs are often located in environments which are signal-noisy, such as, in particular, generators or motors which produce AC signal noise in operation, typically 60 Hz. The 60 Hz AC signal present in the generator is induced in the RTD leads in addition to the RTD DC voltage signal present thereon produced in response to the current from the constant current source. If the induced AC signal exceeds the operating range of the RTD module, the measured signal will be incorrect.

A common technique to eliminate, i.e. block, the AC signal noise from the RTD leads is the use of a low pass filter (LPF) to which the voltage signal (with the AC signal) is applied prior to measurement of the RTD voltage. The low pass filter will block selected frequencies and can be designed to block 60 Hz. However, the LPF has a time constant due to its resistance and capacitive elements, with the time constant being inversely proportional to the cutoff frequency. The lower the cutoff frequency, the longer the time constant.

The low pass filter delays the rate at which the individual RTDs can be sampled for the voltage value by the module, because of its time constant. The voltage cannot be sampled until the filter is charged for accurate results. For instance, if the time constant of the low pass filter requires one second to be fully charged, sampling should not occur for the RTD associated with the low pass filter until the one second has passed. As a result, the rate of sampling the entire group of RTDs served by a particular module will be increased significantly.

The total time between successive samplings of a given RTD for a given module, when the module serves a plurality of RTDs, is referred to as the "refresh rate". With the use of a low pass filter for each RTD, which eliminates the AC noise, the refresh rate will increase significantly. In one typical example, for a module serving four RTDs, the refresh rate may increase from 1 second to 10 seconds. Such an increase in refresh rate is unacceptable in many cases, since it allows too much time for undetected significant increases in temperature.

Hence, while a low pass filter is effective in eliminating AC noise, the resulting substantial increase in refresh time is a significant disadvantage. Hence, it is desirable to significantly reduce the refresh time when low pass filters are used with RTDs.

SUMMARY OF THE INVENTION

Accordingly, the present invention, in one aspect is a system for improving noise immunity for a resistive temperature device (RTD) module, comprising: an RTD system which includes a plurality of resistive temperature devices (RTDs) and an RTD bank assembly to which the RTDs are connected, the RTD bank assembly including a current source applied successively to the RTDs connected thereto, a switching means for switching the current source successively between the plurality of RTDs in a known sequence, and a measurement assembly for measuring the voltage drop across each RTD when the current source is connected thereto, the RTD system further including a calculation circuit for calculating the resistance of the RTD from the current applied thereto and the voltage drop thereacross; a plurality of low pass filters associated, respectively, with the plurality of RTDs, wherein when the voltage across an RTD is applied to its associated low pass filter, the low pass filter charges over time, wherein the voltage on the low pass filter is not used in calculating resistance of an RTD until the low pass filter associated with the RTD reaches a preselected level of charge wherein the plurality low pass filters are charged in turn and the voltage thereon sampled; and a system for successively precharging low pass filters associated, respectively, with successive RTDs prior to sampling thereof, so that delay in sampling is significantly reduced.

In another aspect, the present invention is a system for improving noise immunity in an RTD, comprising: an RTD system which includes a plurality of RTDs and an RTD bank assembly to which the RTDs are connected, the RTD bank assembly including a current source for the application to the RTDs, a switching system for switching the current source between the RTDs and a measurement assembly for measuring the voltage across the RTDs in response to the current being connected thereto, the RTD system further including a calculation function for determining the resistance of the RTD from the voltage and current measurements; a plurality of low pass filters associated, respectively, with each RTD in the plurality of RTDs, wherein the low pass filters are charged only to a selected level which is less than a full charge level before voltage sampling thereof is carried out, and at least one RTD calibration resistor and a low pass filter associated therewith, the calibration resistor having a preselected value and connected such that voltage sampling of the low pass filter associated with the RTD and the low pass filter associated with the calibration resistor are made at the same level of charge of the low pass filter prior to full charge, the sampled voltage values associated with the calibration resistor being used to produce a resulting value which is correlated with a voltage value produced when the low pass filter associated with the RTD is fully charged, wherein the delay between sampling successive RTDs is thereby reduced.

BEST MODE FOR CARRYING OUT THE INVENTION

Figure 1:
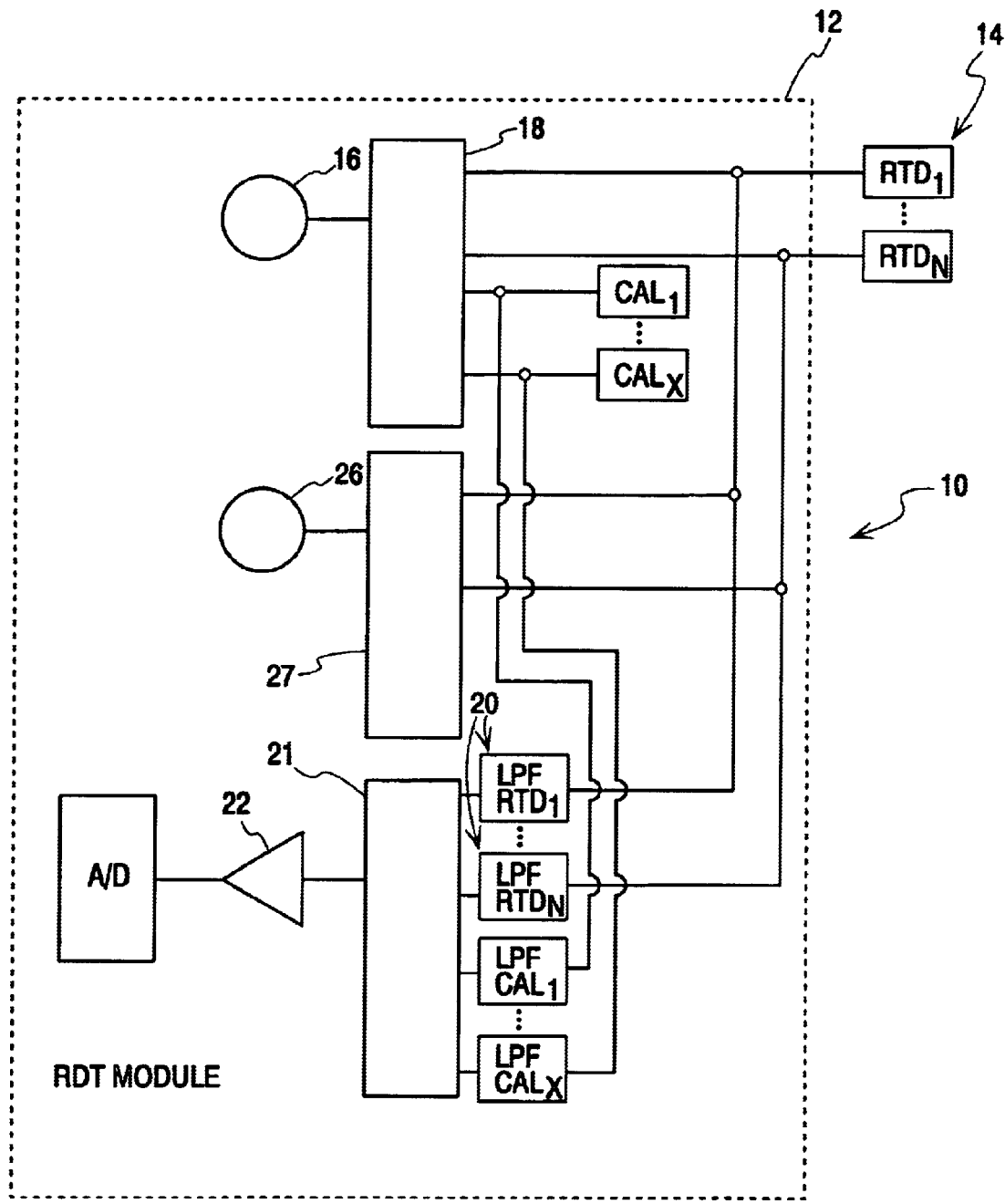
FIG. 1 is a block diagram showing one embodiment of the RTD module system of the present invention.

FIG. 1 shows a block diagram of the system of the present invention for improving noise immunity for a resistive temperature device (RTD) module without at the same time significantly increasing the system refresh rate, i.e. the time to carry out one sampling sequence of the RTDs associated with the module. As indicated above, an RTD is a device which changes resistance in a known manner in response to a change of temperature in the environment in which the RTD is located. Typical operating environments for an RTD include motors, generators and similar devices. The change in resistance in the RTD is determined by an RTD module which applies a current to the RTD from a highly accurate current source. The voltage drop across the RTD as a result is then determined and the resistance of the RTD at that point in time is then calculated.

Typically, an RTD module will serve a plurality of RTDs; a current signal will be applied to each RTD in turn. An RTD module may include a single or multiple RTD banks, with each bank associated with a separate set of RTDs, as explained in more detail below. The time to accomplish one sampling of all the RTDs served by a module is known as "refresh time". If the sampling speed in an RTD module is one sample (one RTD) per second, the refresh time for a group of three RTDs connected to one module would be three seconds. The number of RTDs used with a given module can certainly vary, however. For instance, an RTD module may include a plurality of RTD banks, each of which serves its own plurality of RTDs.

FIG. 1 shows the system 10 of the present invention involving a single RTD module, shown at 12, with the RTD module 12 serving a plurality (N) of RTDs, in this case N=three, referred to at 14—14. The RTD module 12 also includes a highly accurate current source 16 and a multiplexer 18 which switches the current source 16 between successive RTDs 14—14 in accordance with certain protocols. In operation, the constant current source 16 will apply a current of known value, i.e. for instance 4 milliamps, to each RTD 14—14 in turn. The resulting voltage drop across the RTDs is then measured so that the resistance of the RTD at a particular time can be determined, as discussed in more detail below.

The system of the present invention also includes a plurality of low pass filters 20—20. An amplifier 22 measures (samples) the voltage, from the low-pass filters, so that an RTD resistance can thereafter be determined. Each RTD 14 (1-N) will have an associated low pass filter 20 (1-N). The low pass filters, as explained above, have a time constant which is inversely proportional to the low frequency cutoff point. It is desirable, however, to use low pass filters, because they are quite effective in eliminating AC noise.

As indicated above, the disadvantage of using low pass filters is the significant increase in refresh rate, because the LPF takes a particular time to charge to its full value, following the application of the current value, at which point the voltage across the RTD can be accurately measured. Hence, instead of being able to measure the voltage drop across the RTD immediately upon application of a current from the current source, the voltage measurement must be delayed until the low pass filter is charged. Typically, for a 60 Hz low pass filter cutoff frequency, several seconds will be required for the low pass filter to charge completely so that an accurate sample of the voltage can be determined, prior to making the RTD resistance calculation.

In the present invention, to reduce the refresh time, the low pass filter associated with the next successive RTD in a particular plurality of RTDs is precharged while the voltage on the previous RTD low pass filter is being sampled. For a module with a single RTD bank assembly involving one plurality of RTDs, this will require a second current source. This second current source is shown at 26 in FIG. 1, with its associated multiplexer 27. The multiplexer 27 like multiplexer 16 is connected to RTDs 1-N. In operation of the embodiment of FIG. 1, the first current source 16 is turned on and multiplexer 18 is switched to charge the low pass filter associated with the first RTD connected to the bank. When the first low pass filter is fully charged, then the voltage therefrom is sampled. The multiplexer 27 switches the second current source 26 to precharge the second low pass filter associated with the second RTD. The precharged second low pass filter voltage is then sampled by multiplexer 27, with the third LPF associated with the third RTD being precharged by the first current source 16. The sources 16, 26 and multiplexers 18, 27 alternate such that when the voltage on a low pass filter associated with a given RTD in the module is being sampled, with one current source providing current to that RTD, the voltage from the LPF associated with the successive RTD to be sampled is being or has been precharged by the other current source.

Such an arrangement produces a significant reduction in the refresh time produced by the use of the low pass filters. In one example, a given system with a refresh time of two seconds without low pass filters would have a refresh time of 4 seconds with the low pass filters and the system of the present invention (assuming 12 RTDs).

In another embodiment, which includes a plurality of RTD bank assemblies within an RTD module, with each bank assembly serving a plurality of RTDs connected thereto, the sampling and precharging steps are switched successively between the RTD bank assemblies. In such an embodiment, a single current source for each bank assembly is sufficient. In this embodiment, shown in FIG. 2, for two RTD bank assemblies 30, 32 as the simplest example, at power-up, the current sources for both RTD bank assemblies (current source 31 in bank assembly 30 and a corresponding source in bank assembly 32) will be turned on and the respective multiplexers (multiplexer 36 in bank assembly 30 and corresponding multiplexer in bank assembly 32) switched to charge the low pass filters for the first RTDs connected to the two banks 30 and 32 (filter 40 for RTD 42 in bank 30, and corresponding filter/RTD for bank 32). The output of the low pass filters in bank assembly 30 are applied to a multiplexer 46, which controls which LPF in bank assembly 30 is to be connected to RTD module multiplexer 48, which switches between the plurality of RTD banks connected thereto. The output of multiplexer 48 is then applied to an operational amplifier 50 and then to an A/D converter 52.

Following full charging of each of the first low pass filters connected to each RTD bank assembly, the voltage from the first low pass filter 40 for the first bank 30 is amplified and sampled. The current source 34 serving RTD bank assembly 30 is then switched by multiplexer 36 to begin charging the second low pass filter associated with the second RTD associated with bank 30. Next, the voltage on the low pass filter associated with the first RTD served by RTD bank 32 is sampled, with the current source in bank 32 then being switched by the multiplexer in bank 32 to the second RTD of bank 32, to precharge the low pass filter associated with that RTD. Next the voltage on the LPF associated with the second RTD associated with bank 30 is sampled. The process continues in the same sequence, alternately sampling and precharging, and alternating between RTD banks 30 and 32. With additional banks of RTDs, each associated with its own plurality of RTDs, the sequence is the same as described above, alternating between successive banks, sampling and precharging, e.g. charge the LPF for RTD 1 for all banks, sample the voltage from the LPF for RTD 1 of bank No. 1, precharge the LPF for RTD 2 of bank No. 1; sample the voltage from the LPF for RTD 1 of bank No. 2, precharge the LPF for RTD 2 of bank No. 2; sample the voltage from RTD 1 of bank No. 3; precharge the LPF of RTD 2 of bank No. 3, etc.

As with the single bank of RTDs, which uses two current sources, the RTD system using a plurality of banks of RTDs improves the refresh rate significantly. For example, for a system of four banks of RTDs, the refresh rate with the system of the present invention could be 4 seconds, as opposed to a refresh rate of 2 seconds without LPFs and a refresh rate of 15 seconds with low pass filters but without precharging.

A further improvement for the refresh rate, which can be used either alone or preferably in combination with the precharging of the low pass filters, involves the use of low pass filters in combination with calibration resistors, which are typically needed for the RTD module system in any event. The calibration resistors are located within the module and thus are not susceptible to AC noise. Conventional RTD systems use calibration resistors but do not use LPFs therewith (there is no need to block the AC noise for the calibration resistors). In the further improvement, also shown in the one RTD bank embodiment in FIG. 1, low pass filters are used with each calibration resistor. Calibration resistors are shown at 24—24 in the one bank system of FIG. 1. The low pass filters are used with the calibration resistors to permit sampling of the RTD voltage in the low pass filters associated with the RTDs before the LPFs reach full charge, thus saving additional time in sampling and further improving the refresh time.

A separate calibration resistor 24 and associated LPF is required for each type of RTD served by the RTD bank. There are a plurality of known RTD types used in existing systems, the most common being copper, nickel and platinum. Each type of RTD has a known resistance/temperature characteristic, i.e. the resistance of the RTD changes in accordance with changes in temperature in a known way. Also, each type of RTD has a known resistance at 0° C. For an embodiment like FIG. 1 with a single bank of RTDs, the number of calibration resistors and associated LPFs will equal the number of different types of RTDs in the bank. When a plurality of banks of RTDs are present in a particular embodiment, the total number of calibration resistors and associated LPFs present will be equal to the number of different types of RTDs in each bank. Typically, there is a set of calibration resistors and LPFs for each bank of RTDs, the number depending upon the number of different types of RTDs in the bank.

Figure 2:
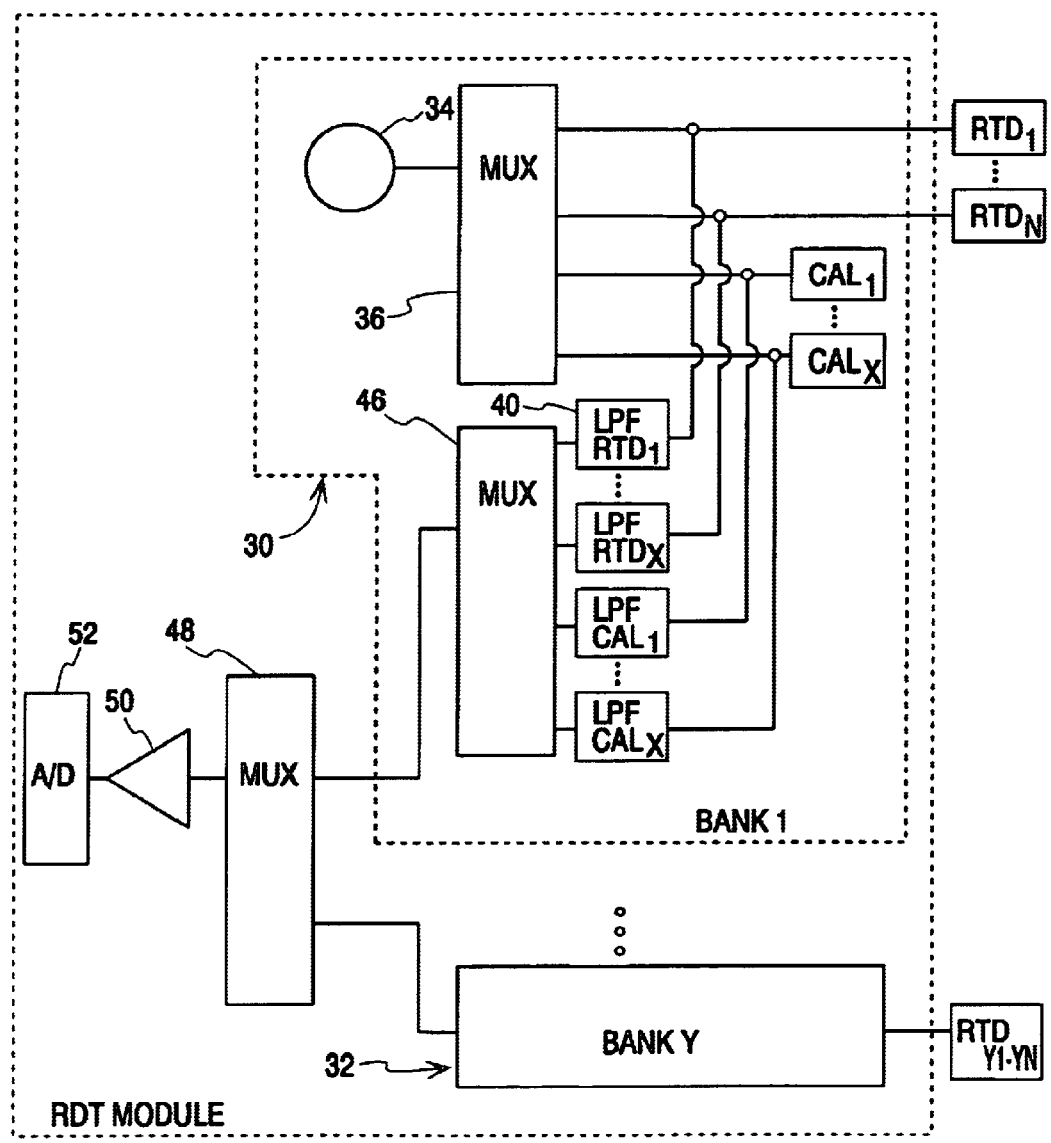
FIG. 2 is a block diagram showing another embodiment of the RTD module system of the present invention.

However, in some situations it is possible that only a single calibration resistor and associated LPF for each type of RTD in the entire system of multiple RTD banks, such as shown in FIG. 2, is possible, i.e. if there are only three different types of RTDs among the entire plurality of banks of RTDs, then only three calibration resistors and associated LPFs are needed. Again, however, the number of calibration resistors and associated LPFs will typically be based on the number of different RTDs within each bank of RTDs.

The calibration resistor for each type of RTD will have a resistance value equal to or correlated with the resistance value of the RTD at 0° C. In operation, the voltage from the LPF associated with a given RTD is sampled at a selected time before the low pass filter is fully charged and the voltage across the calibration resistor, connected to its LPF, will be sampled at the same time. A typical range is between 50% and 90% of full charge.

An error is introduced in the value of the voltage measured from the LPF when the voltage is measured before the low pass filter is fully charged. However, the same error is present in the voltage measurement from the LPF associated with the calibration resistor as the LPF. When the measured voltage from the LPF for the RTD is divided by the voltage from the LPF for the calibration resistor, the error drops out and a correct ratio remains. The correct voltage/temperature for the RTD can then be determined from the ratio. By taking voltage measurements before the low pass filters are fully charged, refresh time is improved.

The voltage across the RTD and its associated calibration resistor will be the same or correlated at 0° C. As the temperature changes, the voltage across the RTD will change, due to a change in resistance, while the voltage across the calibration resistor will not. Dividing the RTD voltage by the calibration resistor voltage will thus produce the full-scale ratio, i.e. as if the RTD low pass filter had been fully charged.

Figure 3B:
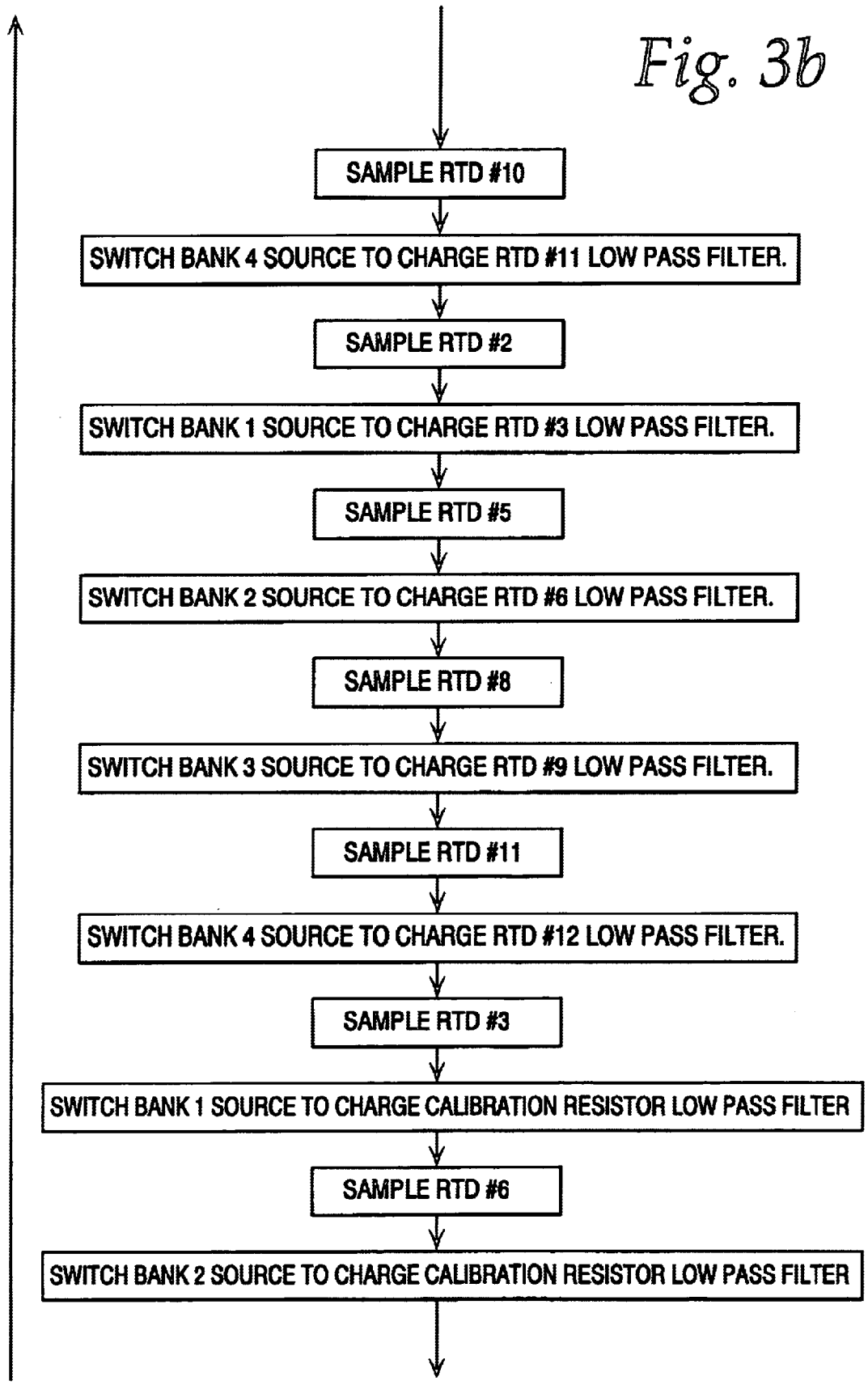
FIG. 3 is an operating schedule/sequence for the embodiment of FIG. 2.
Figure 3C:
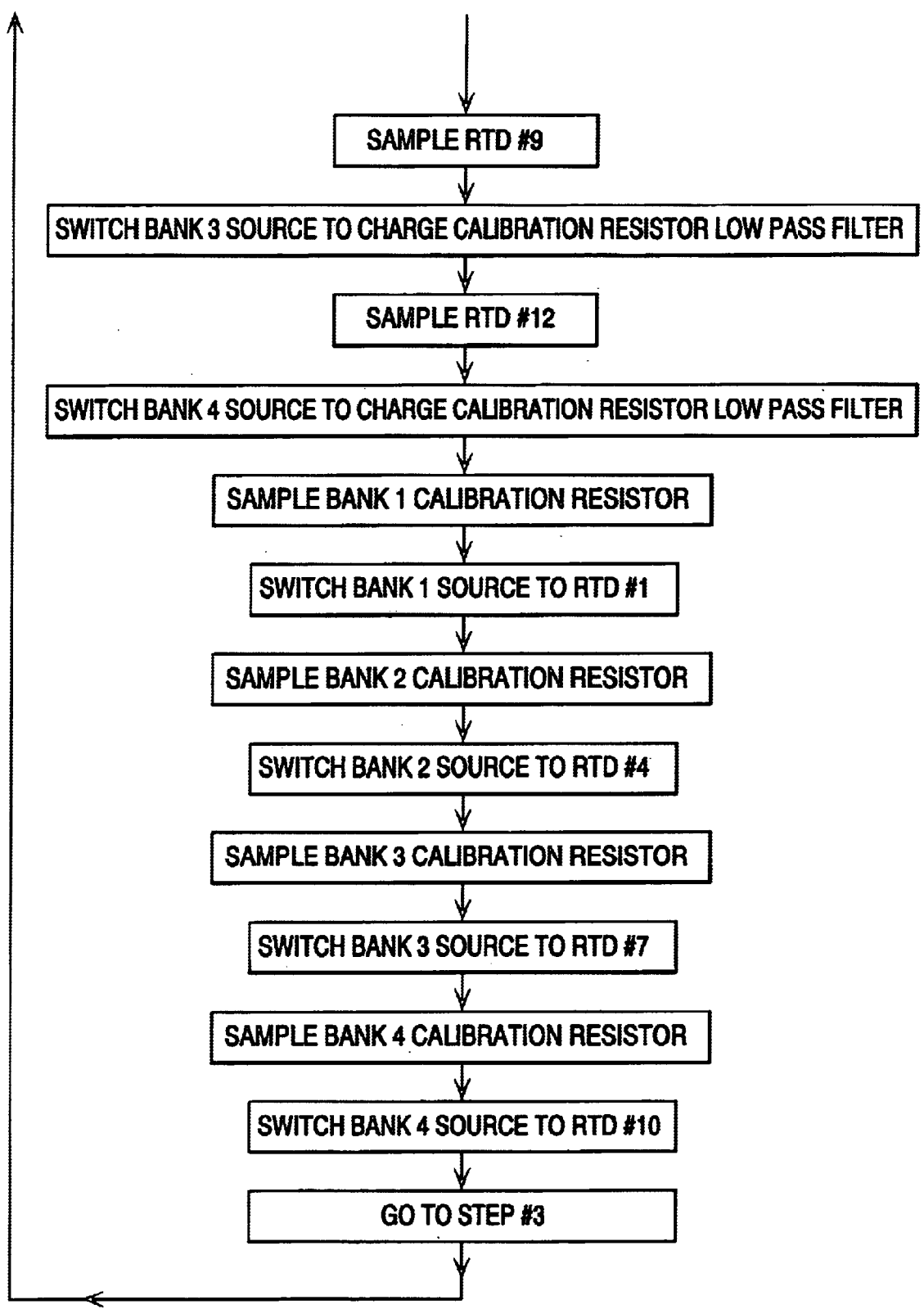

FIG. 3 shows an operational precharging/early sampling sequence for a system with multiple RTD banks using both precharging and early sampling.

Hence, a system has been described which improves significantly the refresh time which is otherwise degraded by use of low pass filters used conventionally for eliminating noise from the RTD system. Two techniques/improvements are used which can be used jointly or separately, one involving precharging of low pass filters associated with each RTD to reduce delay in successive sampling of the RTDs, while the other involves the use of LPFs with calibration resistors, which provides an accurate ratio which in turn is used to produce a voltage/temperature value as if the RTD low pass filter had been fully charged.

Although a preferred embodiment of the invention has been described for purposes of illustration, it should be understood that various changes, modifications and substitutions may be incorporated in the embodiment without departing from the spirit of the invention which is defined in the claims which follow.

What is claimed:

1. A system for improving noise immunity for a resistive temperature device (RTD) module, comprising:

an RTD system which includes a plurality of resistive temperature devices (RTDs) and an RTD bank assembly to which the RTDs are connected, the RTD bank assembly including a current source applied successively to the RTDs connected thereto, a switching means for switching the current source successively between the plurality of RTDs in a known sequence, and a measurement assembly for measuring the voltage drop across each RTD when the current source is connected thereto, the RTD system further including a calculation circuit for calculating the resistance of the RTD from the current applied thereto and the voltage drop thereacross;

a plurality of low pass filters associated, respectively, with the plurality of RTDs, wherein when the voltage across an RTD is applied to its associated low pass filter, the low pass filter charges over time, wherein the voltage on the low pass filter is not used in calculating resistance of an RTD until the low pass filter associated with the RTD reaches a preselected level of charge wherein the plurality of low pass filters are charged in turn and the voltage thereon sampled; and a system for successively precharging low pass filters associated, respectively, with successive RTDs prior to sampling thereof, so that delay in sampling is significantly reduced.

2. The system of claim 1, wherein the low pass filter being precharged is the next one to be voltage sampled.

3. The system of claim 1, wherein said low pass filter is fully charged before voltage sampling thereof is accomplished.

4. The system of claim 1, including a single plurality of RTDs and a single RTD bank associated therewith, the system further including a second voltage source and a second switching means such that one low pass filter can be precharged by one current source and thereof the voltage thereon sampled while a prior charged low pass filter by the other current source is voltage sampled.

5. The system of claim 1, including at least two plurality of RTDs, each plurality of RTDs having an RTD bank assembly associated therewith, wherein in operation a low pass filter associated with an RTD in one plurality of RTDs is voltage sampled while a low pass filter associated with an RTD in another plurality of RTDs is being precharged, wherein sampling/precharging occurs in sequence between the pluralities of RTDs.

6. The system of claim 1, wherein the voltage and the low pass filter is sampled by the measurement system prior to the low pass filter being fully charged, such that the sampled voltage has an error, the system further including an calibration resistor and a low pass filter associated therewith, the calibration resistor having a preselected resistance value correlated within the resistance of the RTD at a selected temperature, wherein a sampling is made of the voltage on the low pass filter associated with the calibration resistor when the low pass filter is at the same charge level as the charge level of the low pass filter associated with the RTD, wherein the system further includes a dividing circuit for dividing the sampled voltage value from the low pass filter associated with the calibration resistor into the sampled voltage value from the low pass filter associated with the RTD, resulting in a correct ratio value which is correlated with a voltage value for a fully charged low pass filter.

7. A system for improving noise immunity in an RTD, comprising:

an RTD system which includes a plurality of RTDs and an RTD bank assembly to which the RTDs are connected, the RTD bank assembly including a current source for the application to the RTDs, a switching system for switching the current source between the RTDs and a measurement assembly for measuring the voltage across the RTDs in response to the current being connected thereto, the RTD system further including a calculation function for determining the resistance of the RTD from the voltage and current measurements;

a plurality of low pass filters associated, respectively, with each RTD in the plurality of RTDs, wherein the low pass filters are charged only to a selected level which is less than a full charge level before voltage sampling thereof is carried out; and at least one RTD calibration resistor and a low pass filter associated therewith, the calibration resistor having a preselected value and connected such that voltage sampling of the low pass filter associated with the RTD and the low pass filter associated with the calibration resistor are made at the same level of charge of the low pass filters prior to full charge, the sampled voltage values being used to produce a resulting value which is correlated with a voltage value produced when the low pass filter associated with the RTD is fully charged, wherein the delay between sampling successive RTDs is thereby reduced.

8. The system of claim 7, including a separate calibration resistor and low pass filter for each different type of RTD in the plurality of RTDs.

9. The system of claim 7, wherein the preselected resistance of the calibration resistor at 0° C. is correlated with the resistance of the RTD with which it is associated at 0° C.

10. The system of claim 7, wherein the value of the sampled voltage from the low pass filter associated with the calibration resistor is divided into the value of sampled voltage from the low pass filter associated with the RTD to produce the resulting value.

* * * * *